(No Model.)  3 Sheets—Sheet 1.

A. BEHR.
APPARATUS FOR TREATING CORN IN THE MANUFACTURE OF STARCH, GLUCOSE, AND OTHER PRODUCTS THEREFROM.

No. 247,153.  Patented Sept. 20, 1881.

WITNESSES.
Arthur Krause,
Grace G. Pike

INVENTOR
Arno Behr
Per Edw. E. Quimby,
atty.

(No Model.) 3 Sheets—Sheet 2.

A. BEHR.
APPARATUS FOR TREATING CORN IN THE MANUFACTURE OF STARCH, GLUCOSE, AND OTHER PRODUCTS THEREFROM.

No. 247,153. Patented Sept. 20, 1881.

WITNESSES,
INVENTOR.

(No Model.)

A. BEHR.

APPARATUS FOR TREATING CORN IN THE MANUFACTURE OF STARCH, GLUCOSE, AND OTHER PRODUCTS THEREFROM.

No. 247,153. Patented Sept. 20, 1881.

WITNESSES,

INVENTOR,

UNITED STATES PATENT OFFICE.

ARNO BEHR, OF JERSEY CITY, NEW JERSEY.

APPARATUS FOR TREATING CORN IN THE MANUFACTURE OF STARCH, GLUCOSE, AND OTHER PRODUCTS THEREFROM.

SPECIFICATION forming part of Letters Patent No. 247,153, dated September 20, 1881.

Application filed August 2, 1881. (No model.)

*To all whom it may concern:*

Be it known that I, ARNO BEHR, of Jersey City, New Jersey, have invented certain Improvements in Apparatus for Treating Corn in the Manufacture of Starch, Glucose, and other Products therefrom, of which the following is a specification.

My invention relates to apparatus for automatically separating corn which has been previously softened and crushed into three parts, according to the process described in my application for a patent therefor filed July 27, 1881, which process consists in continuously introducing into a separating-tank provided with a stirrer crushed corn and water in such relative proportions as to form a mixture of the density of from, say, 10° to 12° Baumé, in order that the germs shall rise to the surface and be floated off in a current made to overflow from the separating-tank by the influx of crushed corn and water thereinto, this current being composed of a mixture of the mealy parts of corn and water, and being discharged into a suitable reservoir through the meshes of a sieve, which catches the germs and discharges them into a separate receptacle, the hulls and other heavier portions of the corn which do not rise to the surface being removed by mechanical means from the lower stratum of the mixture in the separating-tank.

Figure 1:
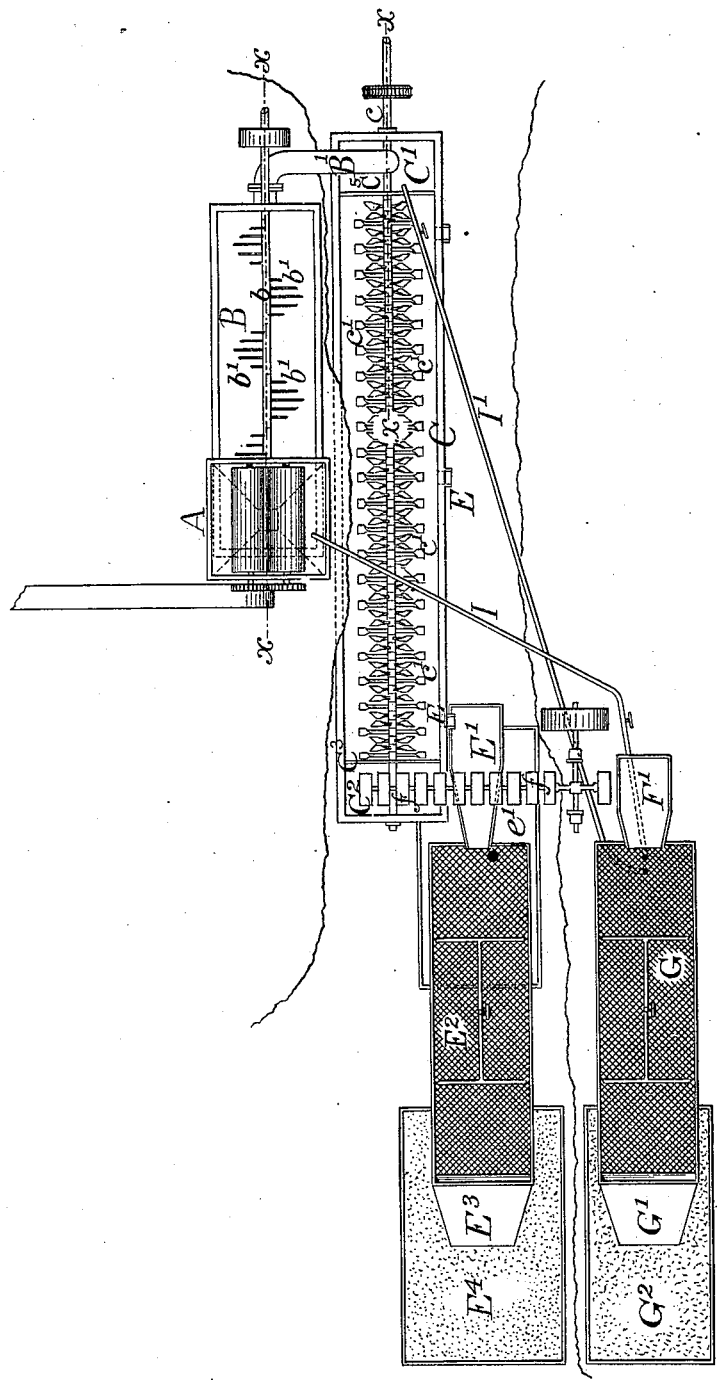
Figure 2:
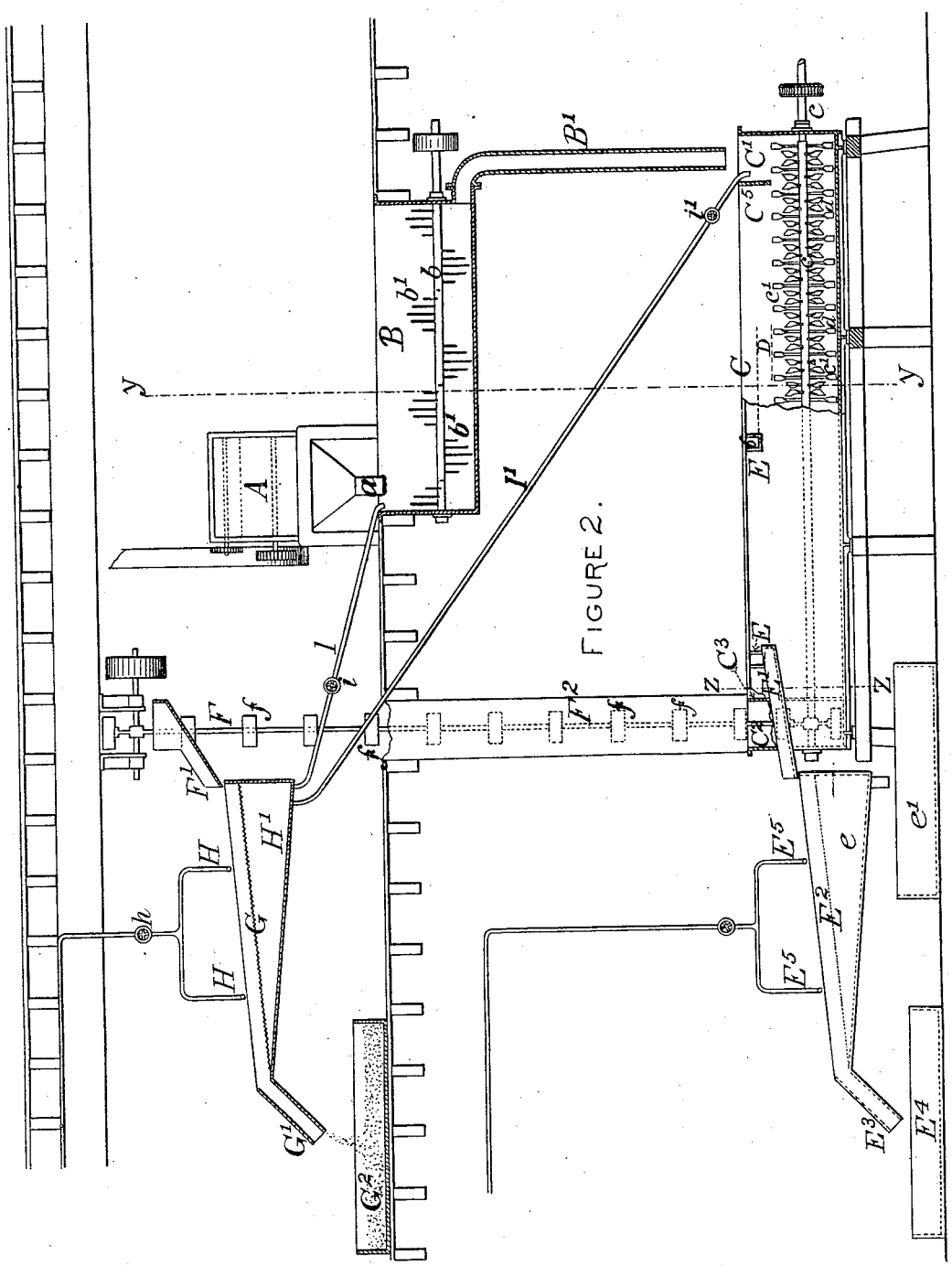
Figures 3, 4:
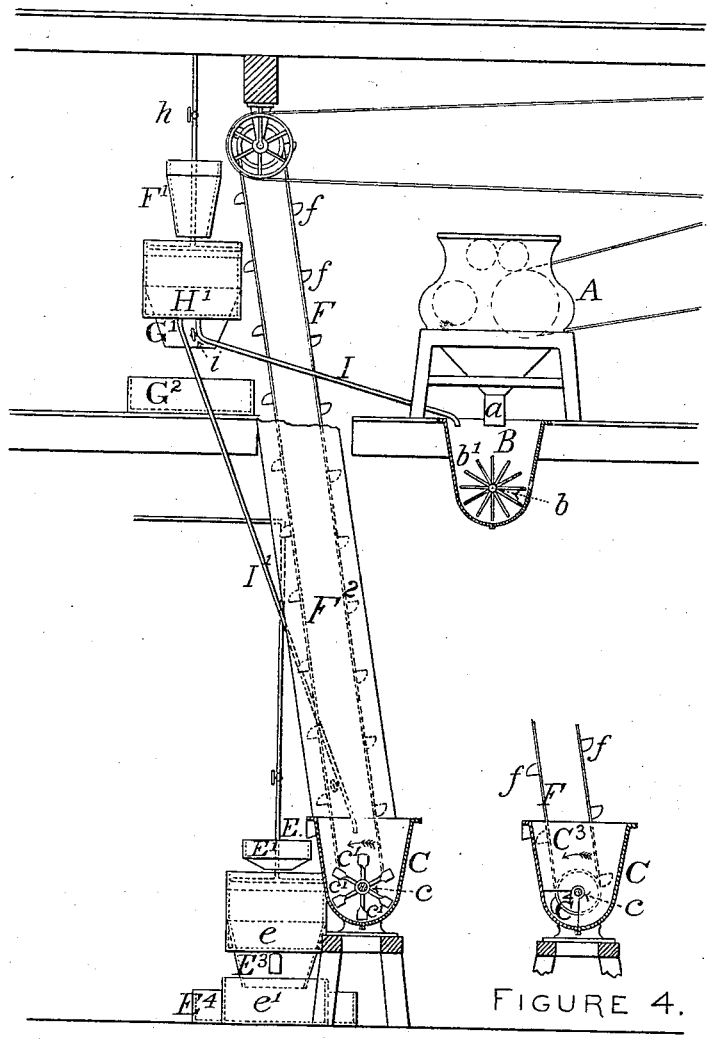

The accompanying drawings, illustrating apparatus embodying my improvements, are as follows:

Figure 1 is a top view, a portion of the floor which supports the upper parts of the apparatus being represented as broken away in order to more clearly exhibit those parts of the apparatus which are supported upon a lower floor. Fig. 2 is a side elevation, partly in longitudinal vertical section, through the line $x\ x$ on Fig. 1. Fig. 3 is a transverse vertical section through the line $y\ y$ on Fig. 2. Fig. 4 is a transverse vertical section of the separating-tank through the line $z\ z$ on Fig. 2.

My apparatus embraces a crushing-mill, A, of ordinary construction, provided with a chute, $a$, by which the crushed corn is discharged into one end of a mixing-tank, B. The mixing-tank is provided with a horizontal rotating shaft, $b$, having affixed to it radial arms $b'$, arranged spirally around the shaft. By the rotation of the shaft $b$, carrying the radial arms $b'$, the crushed corn is mixed with water supplied through the pipe I, as will be hereinafter more fully explained. Owing to the spiral arrangement of the radial arms $b'$, the mixture of crushed corn and water is pushed longitudinally along the mixing-tank and discharged through the pipe $B'$ into the receiving-compartment $C'$ of the separating-tank C. The separating-tank is provided with a horizontal rotating shaft, $c$, having affixed to it radially-arranged paddles $c'$, the blades of which are slightly inclined to the planes in which they rotate, so that they tend to push the solid material contained in the separating-tank toward the settling-compartment $C^2$. This compartment is separated from the interior portion of the separating-tank by the vertical partition $C^3$, provided with the opening $C^4$. (Shown in Fig. 4.) The interior portion of the tank C is separated from the receiving-compartment $C'$ by the vertical partition $C^5$, extending only partially down into the tank C, as shown in Fig. 2. The object of the partition $C^5$ is to prevent the upper stratum, D, of the mixture in the separating-compartment from being agitated by the dropping of the corn fed into the receiving-compartment $C^2$. Water is also introduced into the receiving-compartment, when required, through the pipe $I'$, as will hereinafter be more fully explained.

By the rotation of the shaft $c$, provided with the paddles $c'$, disintegrated mealy parts of the corn are thoroughly mixed with water, the supply of which is so proportioned as to maintain the mixture in the separating-tank at such density that the germs will tend to rise to the surface thereof, while the hulls and other heavier portions of the corn will not rise above the lower stratum, $d$, but will remain therein while being pushed along by the rotating paddles into the settling-compartment $C^2$. The germs, which by reason of their lower specific gravity rise to the surface of the mixture, are carried off in the current overflowing through the chute E and trough $E'$ and deposited upon the inclined vibrating sieve $E^2$, through the meshes of which the fluid overflowing from the separating-tank drains into the trough $e$, from the lower end of which it is conducted into the reservoir $e'$. The fluid thus collected in the reservoir $e'$ is a mixture composed of the larger proportion of the mealy parts of the corn with water, and, for convenience, I call this mixture "starch-milk." The germs are discharged from the lower end of the inclined vibrating sieve $E^2$ through the chute $E^4$. The usual spraying-pipes $E^5$ are provided for washing the germs on the sieve $E^2$, and the wash-water is also caught in the trough $e$ and conducted to the reservoir $e'$.

For clearness of illustration the sieve for screening the germs is represented as placed beyond the end of the separating-tank; but in practice it will probably be found more convenient to arrange this sieve at the side of the separating-tank and to have the chute $E^6$ at or near the middle of the separating-tank, in which case it may discharge the overflow directly upon the sieve $E^2$. It will also be understood that the locations of the starch-milk reservoir $e'$ and of the germ-receptacle $E^4$ may be varied as convenience may require.

The starch-milk will be conducted from the reservoir $e'$ to the starch-tables, or to such other appurtenances as may be employed in its further manufacture. In like manner the germs will be taken from the receptacle $E^4$ for such further disposal as may be desired.

The hulls and other heavier portions of the corn, which are pushed into the settling-compartment $C^2$ by the rotating propelling-paddles $c'$, are scooped out of the bottom of that compartment by means of the endless elevator-chain F, carrying the wire-cloth or perforated buckets $f$, and are deposited upon the chute $F'$, by which they are conducted to the inclined vibrating sieve G, where they are washed by water discharged from the usual spraying-pipes, H H, the supply of such water being regulated by the valve $h$. The hulls and heavier portions are discharged from the lower end of the chute $G'$ into a suitable receptacle, $G^2$. The water from the spraying-pipes H H washes off the finer particles of starchy matter which may be brought up with the hulls and drains through the meshes of the sieve G into the trough $H'$, from the lower end of which it is conducted by the pipe I to the mixing-tank B, and by the pipe $I'$ to the separating-tank C, the pipes I and $I'$ being provided respectively with valves $i$ and $i'$, so that the wash-water from the trough $H'$ may be shut off from either of the tanks B or C when desired.

The elevator-chain above the tank C is inclosed in a box, which serves to catch the drip from the perforated buckets and conduct it back into the settling-compartment. This box is purposely omitted from all the drawings except Fig. 3, in which a portion of it is shown, which is indicated by the letter $F^2$.

The mechanism for vibrating the inclined sieves, being well known and in common use, is also omitted from the drawings and requires no especial description.

By this organization of the apparatus it will be seen that the crushed corn in the mixing-tank is mixed with water which already contains a certain proportion of starchy matter.

It is intended that the density of the mixture in the separating-tank shall be governed by means of the valve $h$, which regulates the supply of wash-water to the sieve G. When the valve $h$ is adjusted to properly supply water, and the mill A is constantly fed with corn which has been softened, the apparatus effects by its operation a continuous automatic separation of the crushed corn into the three parts described, and deposits them, respectively, in three separate receptacles, from which they can be conveniently taken for such further treatment as may be desired.

I claim as my invention in apparatus for separating the germs, hulls, and mealy parts of corn which has been softened, crushed, and mixed with water—

1. A separating tank or compartment provided with a stirrer and having a chute or opening in its wall for fixing the direction of the overflow from the separating-compartment, in combination with an inclined vibrating sieve for screening the germs carried off in the overflow, and a trough or reservoir for receiving the starch-milk which drains through the meshes of such sieve, and means for mechanically removing from the lower stratum of the mixture in the separating-tank the heavier portions of the corn, consisting of the hulls and matter adherent thereto, substantially as described.

2. A separating-compartment substantially such as described, and a settling-compartment and means for gradually pushing the heavier matters from the lower part of the separating-compartment into the settling-compartment through a suitable opening in a vertical partition which separates the two compartments from each other, in combination with an endless elevator-chain provided with perforated buckets, and an inclined vibrating sieve for screening the heavier matters brought up by the elevator-buckets and discharged upon such sieve, water-spraying pipes for washing such heavier matters, and a trough or suitable vessel beneath such sieve for receiving the wash-water and other drainage through the sieve, and a pipe or pipes for conducting such drainage to the separating-tank or to a mixing-tank provided with a stirrer for mixing the crushed corn with water preparatory to its being fed into the separating-tank, substantially as set forth.

3. The combination, in an organized system of apparatus substantially such as described, of a mill for crushing corn, a mixing-tank provided with a stirrer for mixing the crushed corn with water, a separating tank or compartment provided with rotating shaft having radial propelling arms or paddles, a reservoir for catching the overflow from the separating-tank, a sieve for screening the germs from the overflow, a settling-compartment for receiving the heavier portions of the corn delivered by the propelling-paddles, an elevator for removing such heavier portions from the settling-compartment, an elevated sieve for screening such heavier portions, a water-spraying pipe provided with a valve for regulating the supply of water for washing such heavier portions, a trough or vessel for receiving the wash-water and other drainage from the elevated sieve, and a pipe or pipes for conducting such drainage to the mixing-tank or to the separating-tank, all arranged and operating substantially in the manner and for the purposes set forth.

4. The separating-tank C, provided with the chute E and with the transverse partition $C^3$, having the opening $C^4$, in combination with the horizontal rotating shaft $c$, provided with the radially-projecting paddles $c'$, substantially as and for the purposes set forth.

5. In a separating-tank substantially such as described, the shallow vertical partition $C^5$, as and for the purposes set forth.

ARNO BEHR.

Witnesses:
ARTHUR KRAUSE,
GRACE G. PIKE.